Oct. 30, 1934.  E. E. WEMP  1,978,922
FLEXIBLE DRIVE AND DAMPENER
Filed Nov. 5, 1931
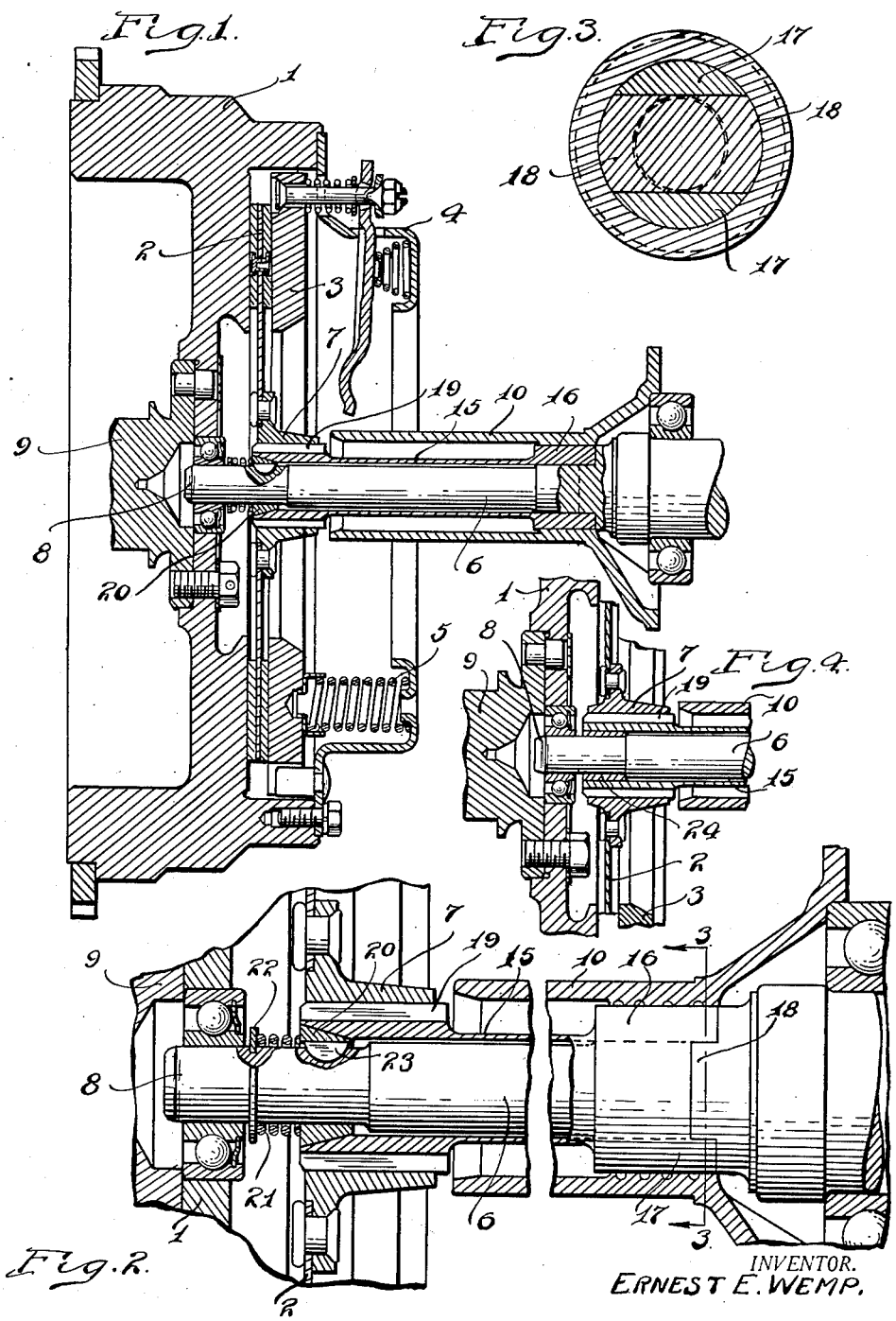
INVENTOR.
ERNEST E. WEMP.
BY Barnes and Kisselle
ATTORNEYS.

Patented Oct. 30, 1934

1,978,922

UNITED STATES PATENT OFFICE 1,978,922

FLEXIBLE DRIVE AND DAMPENER

Ernest E. Wemp, Detroit, Mich.

Application November 5, 1931, Serial No. 573,111

7 Claims. (Cl. 64—96)

This invention relates to a construction the purpose of which is the preventing of engine vibrations being transmitted to parts driven thereby, and in which a dampening effect may be obtained for dampening out such vibrations. The invention is particularly applicable to internal combustion engines and in this regard is useful in automotive vehicles.

The arrangement is one through which the driving power of the engine may be transmitted to the driven parts, and accordingly, the construction may be incorporated at any desirable point or location in the mechanism transmitting the power. An advantageous location for the cushioning and dampening power transmitting structure is adjacent the usual automotive vehicle clutch and, in fact, between one of the clutch parts and driven member. The invention has as an object the provision of a simplified improved structure for forming a resilient or cushion like drive, disposed between the engine and driven parts, and in which the dampening effect may and preferably is obtained.

Fig. 1 is a sectional view taken through a clutch construction showing the engine flywheel and driven shaft as well as the construction contemplated by the present invention.

Fig. 2 is an enlarged section showing the parts more in detail.

Fig. 3 is a cross section taken substantially on line 3—3 of Fig. 2.

Fig. 4 is a view showing a modified arrangement.

A brief description of some of the usual parts is all that is necessary herein. Such parts consist of an engine flywheel 1, a clutch driven disk 2, a clutch pressure ring 3 wherein the clutch driven disk has facing material arranged to be packed between a face of the flywheel and the pressure ring. A clutch cover plate is shown at 4 and packing springs are at 5 which act upon the pressure ring and are backed up by the cover plate. A driven shaft is shown at 6, one end of which is journaled as at 8 in axial alignment with the engine crank shaft 9 so as to be supported thereby. The driven shaft 6 extends rearwardly from the flywheel through a housing or casing 10 which may project from the forward end of a transmission case (not shown), with the shaft 6 extending into such transmission case.

The driven disk of the clutch is designed to drive the driven shaft 6, and in accordance with the present invention there is interposed between the disk and shaft a driving element capable of flexing so as to permit of relative rotation between the disk and driven shaft. This driven element may take the form of a tube or sleeve 15 which may be placed over the driven shaft. The central portion of this sleeve has a relatively thin wall as shown; one end as at 16 may have a thickened wall, and this end is advantageously associated with the driven shaft 6 so as to drive the same. The end 16 of the sleeve may be milled crosswise to form projections 17 interfitting with key like projections 18 which may be formed integrally upon the shaft 6.

The opposite end of the sleeve 15 is connected to the hub 7 of the driven clutch disk as by means of a spline connection 19 for which purpose this end of the sleeve may be of thickened cross section. Throughout the greater portion of its length the sleeve 15 is spaced from the driven shaft 6, and at its forward end, or in other words, at its end adjacent the flywheel, it is piloted on the shaft 6 preferably by means of a bearing. This bearing may be such as to effect a braking action or frictional tendency as between the sleeve and driven shaft, and for this purpose a bearing 20 of conical shape may be provided which fits into an appropriately shaped recess in the end of the sleeve. This conical bearing may be acted upon by a spring 21 backed up by a retaining ring 22. The bearing is preferably keyed to the shaft 6, as by means of the key 23, so as to rotate therewith yet so that it is capable of axial movement.

It will thus be seen that the driven disk of the clutch drives the driven shaft 6 through the intermediacy of the sleeve 15. There is a tendency, as will be appreciated, to twist the sleeve in such action. This sleeve is preferably made of high carbon steel, say of about .5% carbon, thus affording a degree of flexibility. The yield or twist provided in such a sleeve may give approximately one-quarter of an inch yield at the periphery of a disk having a radius of 7½ inches. That is to say, the periphery of the driven disk may move one-quarter of an inch upon yield or flexing of the sleeve without movement of the driven shaft. This amount of movement may be determined in a measure by the length of the sleeve and cross sectional thickness.

In the modified form shown in Fig. 4 all parts heretofore described are shown except the pilot bearing for the sleeve. In this form the bearing 24 is not conical and merely serves the function of a pilot bearing.

In the operation of the engine driving the driven shaft the vibrations or oscillations in the engine are permitted to occur due to the twisting action of the sleeve so that there is no substantial communication of such vibrations in the driven shaft 6. As shown in Fig. 4, the twisting of the sleeve is freely permitted so that the vibrations are not readily telegraphed or communicated into the driven shaft 6. The bearing shown in Figs. 1 and 2 however, affords the additional feature of dampening the vibrations in the engine due to the frictional braking tendency of the bearing 20. It is urged into frictional engagement with the end of the sleeve under spring action. This bearing may be made of bronze or other alloy suitable for the purpose.

I claim:

1. The combination of a driving member, a driven shaft, a metallic sleeve over the driven shaft, means connecting one end of the sleeve to the driven shaft for driving the same, bearing means between the driven shaft and the other end of the sleeve for piloting the sleeve, said connecting means and bearing holding the sleeve and shaft in axial alignment, and means connecting the driving member and said piloted end of the sleeve, said sleeve being capable of flexing or twisting action under load thereby establishing a flexible connection between driving member and driven shaft.

2. The combination with a driving member, a driven shaft, a thin walled metallic sleeve relatively long as regards its diameter over the driven shaft having one end connected to the driven shaft for driving the same, and having its other end piloted on the driven shaft and held in axial alignment with the driven shaft, and means connecting the piloted end of the sleeve with the driving member, said sleeve being capable of flexing or twisting to thereby establish a flexible connection between driving member and driven shaft.

3. The combination of a driving member, a driven shaft, a tube having one end connected to the driven shaft to drive the same, means connecting the other end of the sleeve with the driving member, said sleeve being capable of flexing under driving load to thereby establish a yielding drive connection between driving member and driven shaft, and frictional dampening means for dampening the movements of the end of the sleeve which is connected to the driving member relative to the driven shaft.

4. The combination of a driving member, a driven shaft, a sleeve capable of twisting under load positioned over the shaft having one end connected thereto to drive the same, means connecting the other end of the sleeve with the driving member, a conical shaped pilot bearing between the shaft and the end of the sleeve connected to the driving member, and means for urging said pilot bearing into relatively tight frictional engagement with the sleeve for dampening its movements relative to the driven shaft.

5. The combination of a driving member, a driven shaft, a high carbon steel sleeve relatively long as regards its diameter positioned over the driven shaft having one end connected in driving relation with the shaft and the other connected with the driving member, said sleeve being capable of twisting under torque to thereby establish a flexible drive between the driving member and driven shaft, and friction-creating means interposed between the shaft and the end of the sleeve connected to the driving member.

6. The combination of a driving member, a driven shaft, a high carbon steel sleeve relatively long as regards its diameter positioned over the driven shaft having one end connected in driving relation with the shaft and the other connected with the driving member, said sleeve being capable of twisting under torque to thereby establish a flexible drive between the driving member and driven shaft, and friction-creating means interposed between the shaft and the end of the sleeve connected to the driving member, said last named means comprising a conical shaped piloting bearing.

7. The combination of a driving member, a driven member, a high carbon steel tube relatively long as regards its diameter having one end connected to the driven member to drive the same, means connecting the other end of the tube with the driving member, said tube being capable of flexing under driving load to thereby establish a yielding drive connection between the driving member and the driven member, and frictional dampening means for dampening the movements of the end of the tube which is connected to the driving member relatively to the driven member.

ERNEST E. WEMP.